(12) United States Patent
Anandan et al.

(10) Patent No.: US 8,290,925 B1
(45) Date of Patent: Oct. 16, 2012

(54) LOCATING PRODUCT REFERENCES IN CONTENT PAGES

(75) Inventors: Balamurugan Anandan, West Lafayette, IN (US); Logan Luyet Dillard, Seattle, WA (US); James G. Robinson, Olympia, WA (US)

(73) Assignee: Amazon Technologies, Inc., Reno, NV (US)

( * ) Notice: Subject to any disclaimer, the term of this patent is extended or adjusted under 35 U.S.C. 154(b) by 124 days.

(21) Appl. No.: 12/946,143

(22) Filed: Nov. 15, 2010

(51) Int. Cl.
*G06F 17/30* (2006.01)

(52) U.S. Cl. ...................................... 707/707

(58) Field of Classification Search .............. 707/706, 707/707, 713, 723, 732
See application file for complete search history.

(56) References Cited

U.S. PATENT DOCUMENTS

| | | | | |
|---|---|---|---|---|
| 7,788,216 B2* | 8/2010 | Li et al. | ......................... | 707/603 |
| 7,962,435 B2* | 6/2011 | Yu et al. | ......................... | 706/47 |
| 7,996,393 B1* | 8/2011 | Nanno et al. | ................... | 707/723 |
| 8,078,727 B2* | 12/2011 | Hanson et al. | ................ | 709/226 |
| 8,108,407 B2* | 1/2012 | Tsuzuki et al. | ................ | 707/749 |
| 8,160,977 B2* | 4/2012 | Poulin | ............................ | 706/21 |

\* cited by examiner

*Primary Examiner* — Cam-Linh Nguyen

(74) *Attorney, Agent, or Firm* — Thomas, Kayden, Horstemeyer & Risley, LLP

(57) ABSTRACT

Disclosed are various embodiments for locating product references in community content. Character sequences (n-grams) are extracted from a page of text content. Each n-gram is evaluated as a potential product reference using a product catalog search for the n-gram or a conditional probability for the n-gram. The conditional probability is obtained from behavior-based search data. When the search was used for the evaluation, each n-gram is found to be a potential product based on results from the product catalog search. When the behavior-based search data was used for the evaluation; each n-gram is found to be a potential product based on the conditional probability exceeding a threshold.

22 Claims, 6 Drawing Sheets

LOCATING PRODUCT REFERENCES IN CONTENT PAGES

BACKGROUND

An electronic commerce system operated by an online merchant allows users to purchase products online. Some online merchants also host pages of user-provided community content, such as product reviews, user comments, posts on discussion boards, etc. In creating content for a page related to a particular product, a user may include a reference to another product. Other readers may be interested in obtaining more information about the second product, for example, by viewing a product-specific page in the electronic commerce catalog. However, such readers may have trouble determining exactly which product is being referred to in the user comment, since the text used to refer to the product in the comment may not be the specific product identifier used in the catalog.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to locating references to products within pages of user-provided community content, such as product reviews, user comments, posts on discussion boards, etc. Text analysis and data mining is performed on the pages of community content to identify pools of potential product references. Attributes of the products which correspond to the potential references may be used to narrow from potential to actual product references. Such attributes may include, for example, brand, product category, title, author/artist, etc. Once a product reference has been identified, the community content page may be modified to replace the existing product reference text with a hyperlink to a product-specific page. This data mining process may be performed offline, using pages of already-generated community content, or may be performed while a user is in the process of modifying a community content page.

Figure 1:
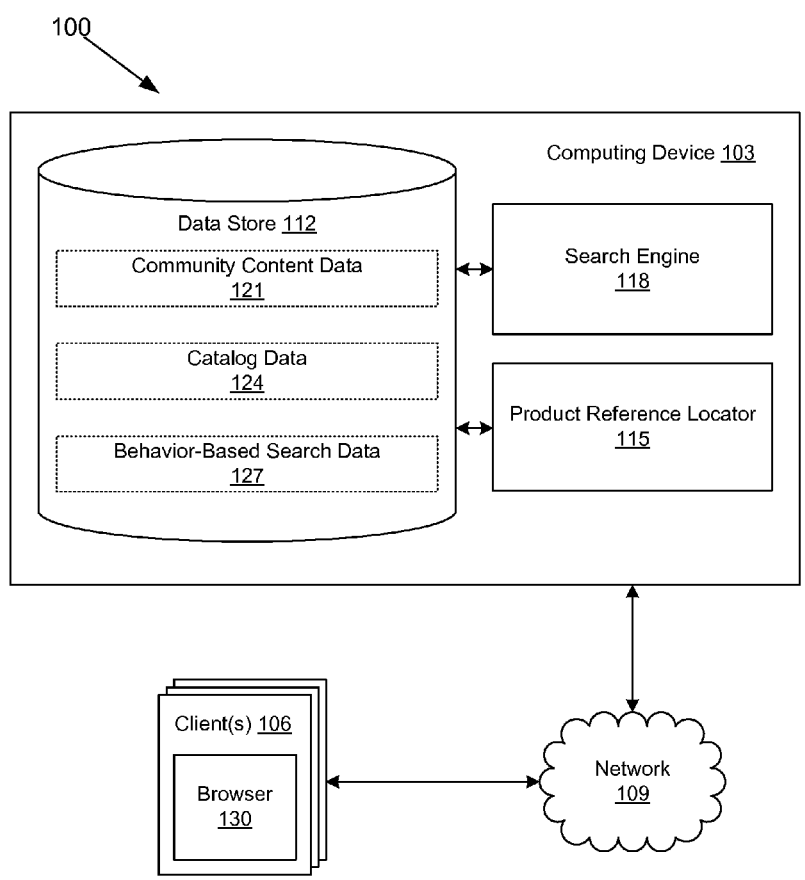
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a product reference locator 115 and a search engine 118. The components executed on the computing device 103 may also include other applications, services, processes, systems, engines, or functionality not discussed in detail herein. The data stored in the data store 112 includes data accessed by the product reference locator 115, for example, community content data 121, catalog data 124, and behavior-based search data 127 as well as potentially other data.

The product reference locator 115 is executed to locate potential product references within pages of community content. The pages of community content may take the form of web pages, text, metadata, etc. The pages are user modifiable, for example, through a user leaving a comment on a product page, through a user posting to a discussion board, etc. The search engine 118 is executed to find a product in catalog data 124 using a search query. In various embodiments, the product reference locator 115 and the search engine 118 may utilize any type of middleware framework to communicate with a client application executing on a client device 106 or with other applications executing on the computing device 103. Examples of such frameworks include remote procedure calls, service-oriented architecture protocol (SOAP), representational state transfer (REST), Windows Communication Foundation, and other frameworks.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a browser 130 and other applications. The browser 130 may be executed in a client device 106, for example, to access and render network pages, such as web pages, or other network content served up by a web server, a page server, or other servers. The client device 106 may be configured to execute applications beyond browser 130 such as, for example, email applications, instant message applications, and/or other applications.

Figure 2:
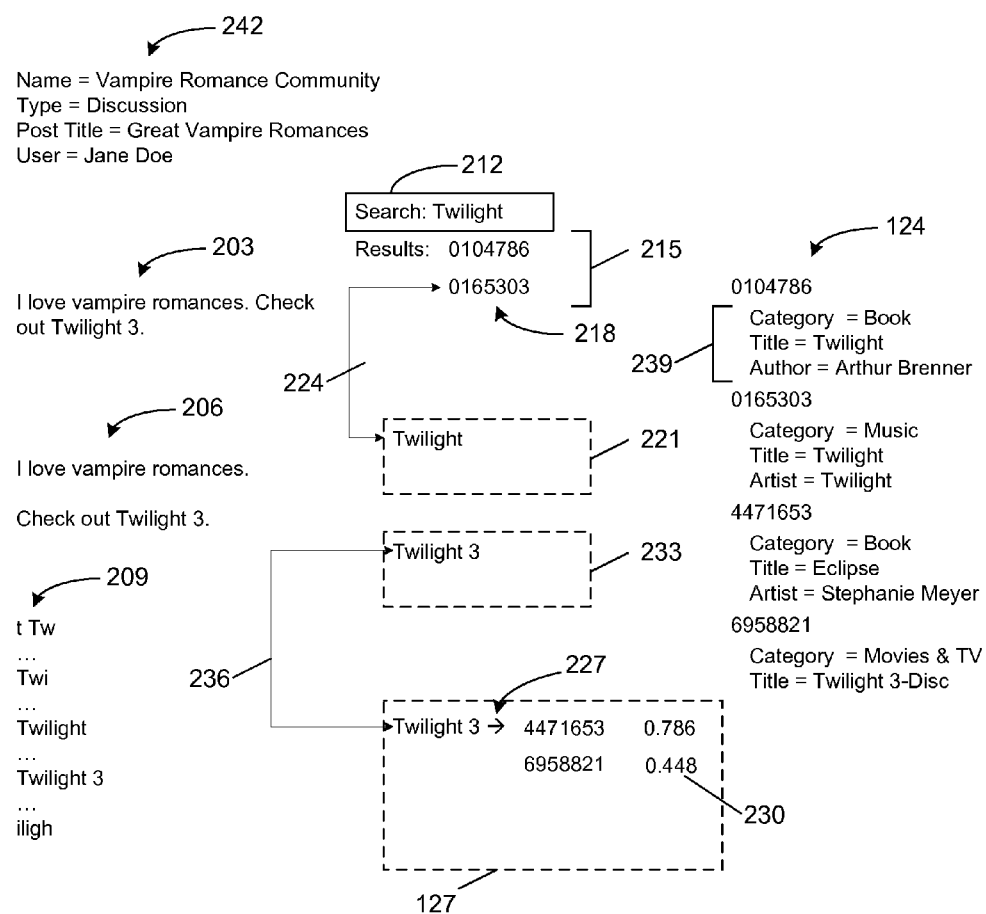
FIG. 2 is a diagram illustrating an example of the operation of a product reference locator application executed in a computing device in the networked environment of FIG. 1 according to various embodiments of the present disclosure.

Referring next to FIG. 2, a general description of the operation of the product reference locator 115 is provided, along with a description of various data used by the product reference locator 115. To begin, the product reference locator 115 obtains a community content page 203 from the community content data 121. The pages of community content include text of any kind. The text may be embedded within web pages, metadata, etc. The community content pages include any form of user-submitted or user modifiable text, for example, through a user leaving a comment on a product page, through a user posting to a discussion board, etc. The product reference locator 115 divides the community content page 203 into sentences 206, then divides the sentences 206 into character sequences called n-grams 209. Data mining is then performed on the n-grams 209 to identify pools of potential product references.

One pool of potential product references is generated by searching the product catalog data 124 using an n-gram 209 as a search query 212. The search results 215 include a list of product identifiers 218 that serve as an index into the product catalog data 124. Any n-gram 209 that returns a product identifier 218 in the search is placed in the first pool of potential product references 221. Each n-gram 209 in the pool 221 is associated 224 with one or more product identifiers 218.

Another pool of potential product references is generated by using an n-gram 209 in conjunction with the behavior-based search data 127. The behavior-based search data 127 is an aggregation of past searches of the product catalog data 124 by multiple users. The behavior-based search data 127 captures user behavior as users perform searches with particular queries, and then follow links in the search results to particular products. Thus, the behavior-based search data 127 indicates how many times a particular search query resulted in a user viewing a product page. An n-gram 209 is used to search behavior-based search data 127. The search results provide a mapping 227 between n-grams 209 and product identifiers 218, and a measure of success for that mapping. More specifically, the search results are used to calculate the probability 230 that using a particular n-gram 209 as a search query will result in the user viewing a particular product. Any n-gram 209 having a probability exceeding a particular threshold is added to the second pool of potential product references 233. Each n-gram 209 in the second pool 223 is associated 236 with a product identifier(s) 218.

Attributes, such as brand, product category, title, author/artist, etc., may be used to narrow the first pool 221 and/or the second pool 233 from potential to actual product references. More specifically, attributes 239 of a product identifier 218 associated with an n-gram 209 in pool 221 or pool 233 are compared to attributes 242 of the community content page 203 which contained the particular n-gram 209. An n-gram 209 that is a potential product reference in the pool 221 or 233 is confirmed as an actual product reference when the comparison is within a predefined range. Product identifier attributes 239 may be obtained from the catalog data 124. Community content attributes 242 may be obtained from metadata of the community content page 203.

Figure 3:
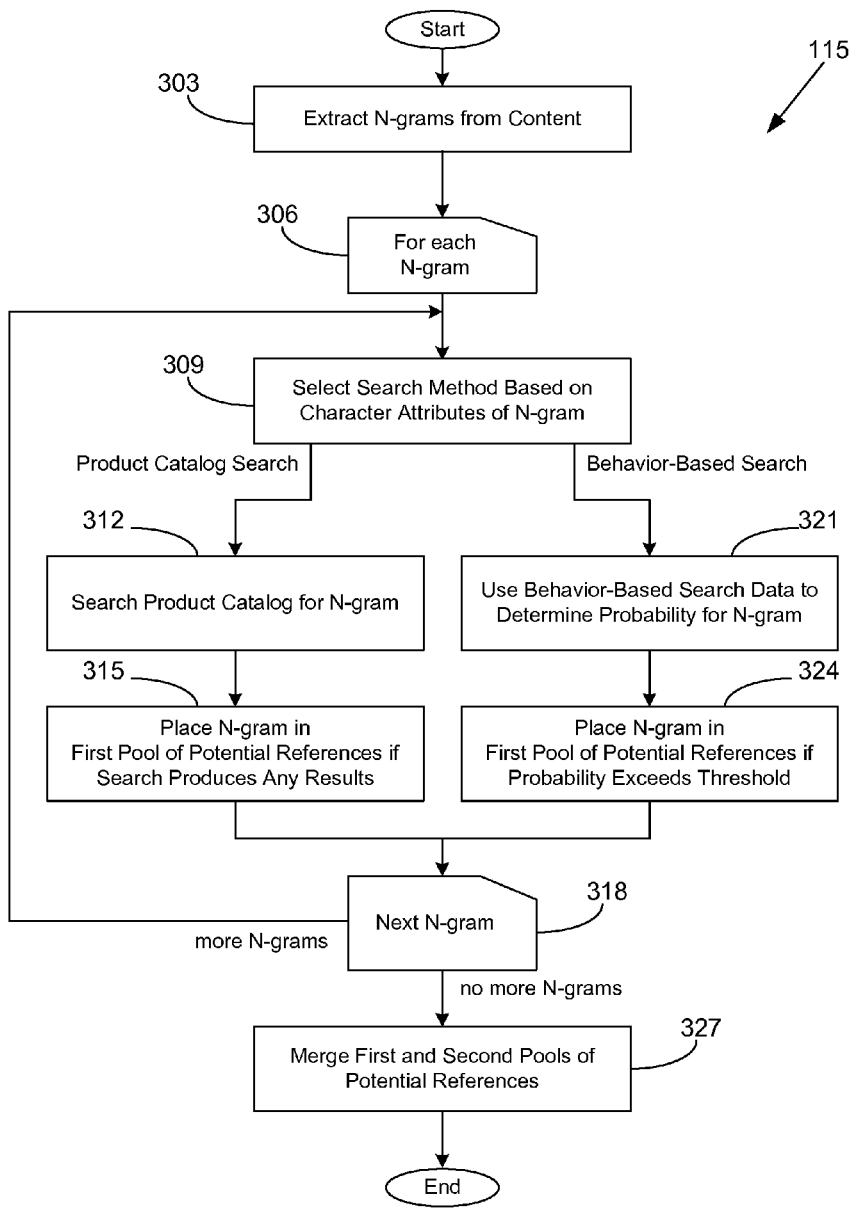
FIG. 3 is a flowchart illustrating another example of functionality implemented as portions of a product reference locator application executed in a computing device in the networked environment of FIG. 1 according to various embodiments of the present disclosure.

Turning now to FIG. 3, shown is a flowchart that provides one example of the operation of a portion of the product reference locator 115 according to various embodiments. It is understood that the flowchart of FIG. 3 provides merely an example of the many different types of functional arrangements that may be employed to implement the operation of the portion of the product reference locator 115 as described herein. As an alternative, the flowchart of FIG. 3 may be viewed as depicting an example of steps of a method implemented in the computing device 103 (FIG. 1) according to one or more embodiments.

Beginning at box 303, the product reference locator 115 extracts the n-grams 209 from a community content page 203, where an n-gram 209 is a subsequence of characters up to a specific length. Thus, if maximum length is 3, the n-grams for the text "go to" are: "g"; "go"" "go "; "o"; "o "; "o t"; " "; " t"; "to"; "t"; and "to." In some embodiments, n-grams may be limited to words and sequences of words, thus excluding sequences within a word or shorter than a word. In some embodiments, the product reference locator 115 may split the text of the community content page 203 into sentences before extracting n-grams.

Next, at box 306 the product reference locator 115 begins an iteration loop to process each of the n-grams 209, starting with the first n-gram 209. At box 309, the product reference locator 115 selects a method to use for determining whether the n-gram 209 is a potential product reference, using either a behavior-based search strategy or a search relevance strategy. The selection is based on character attributes of the n-gram 209. In some embodiments, character attributes of the n-gram are used to categorize the n-gram as an explicit product or an implicit product reference, and the search relevance strategy is used for explicit reference n-grams and the behavior-based search data strategy is used for implicit reference n-grams. As an example, the product reference locator 115 could select the strategy based on the length of the n-gram 209. As another example, the product reference locator 115 could select based on the presence of a particular character, or type of character, in the n-gram 209. Other character attributes could also be used. The product reference locator 115 could also use combinations of attributes to categorize, for example, n-grams with length less than a predetermined value (e.g., five) and including a digit as implicit mentions, and to categorize as explicit mentions otherwise.

In some embodiments, some n-grams are eliminated from consideration as potential product references based on character attributes of the individual n-grams 209. The criteria for elimination may vary depending on the type of search strategy. For example, n-grams 209 that don't use title case (first letter capitalized) might be eliminated before using the search relevance strategy to find potential product references. As another example n-grams 209 that don't include a digit might be eliminated before using behavior-based search data strategy to find potential product references. In addition to eliminating based on criteria, other criteria might be used to keep an n-gram 209 from elimination. For example, an n-gram 209 that includes a quotation mark at its boundary might be saved from elimination even if it doesn't include a digit and/or doesn't use title case. While specific examples are mentioned, other character attributes are also possible.

If at box 309 it is determined that a basic search will be used to identify n-grams as potential product references, the product reference locator 115 continues at box 312. At box 312, the product reference locator 115 searches the product catalog data 124, using the n-gram 209 as a search query 212. At box 315, the product reference locator 115 places the n-gram 209 into the first pool of potential product references 221 if the search for the n-gram 209 produced any search results 215. The product reference locator 115 then continues at box 318.

If at box 309 it is determined that behavior-based search data 127 will be used to identify n-grams as potential product references, the product reference locator 115 continues at box 321. At box 321, the product reference locator 115 uses behavior-based search data 127 to determine whether the n-gram 209 is a potential product reference. Behavior-based search data 127 can be viewed as a mapping between n-grams 209 and product identifiers 218, and a measure of success for that mapping. Next, at box 324 the product reference locator 115 places the n-gram 209 into the second pool of potential product references 233 if the measure of success for the n-gram 209 exceeds a specific threshold. The product reference locator 115 then continues at box 327.

Box 318 is reached after the product reference locator 115 applies one of the methods to determine whether the current n-gram 209 is a potential product reference. At box 318, the iterator moves to the next in the set of n-grams 209 and the product reference locator 115 continues processing at the top of the iteration loop, box 309. If the last n-gram 209 has been processed, then product reference locator 115 moves to box 327. At box 327, the product reference locator 115 merges the pools of potential product references 221 and 233 to eliminate any n-gram 209 that appears in both pools. The process of FIG. 3 is then complete.

Although the flowchart of FIG. 3 includes a number of boxes or functions, these functions are optional, and a particular embodiment may not include all functions. For example, some embodiments include the merge feature in box 327 while others do not.

Figure 4:
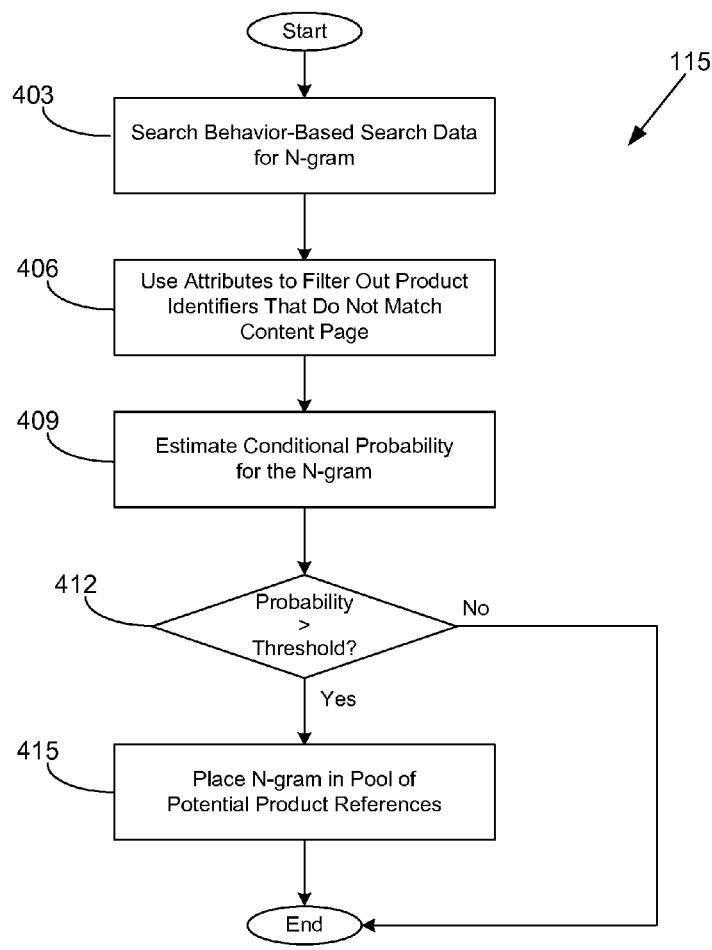
FIG. 4 is a flowchart illustrating another example of functionality implemented as portions of a product reference locator application executed in a computing device in the networked environment of FIG. 1 according to various embodiments of the present disclosure.

As explained above in connection with FIG. 3, the product reference locator 115 uses behavior-based search data 127 to identify some n-grams 209 as potential product references. Moving on to FIG. 4, shown is a flowchart that provides further details of this use of behavior-based search data 127, in various embodiments of the product reference locator 115. It is understood that the flowchart of FIG. 4 provides merely an example of the many different types of functional arrangements that may be employed to implement the operation of the portion of the product reference locator 115 as described herein. As an alternative, the flowchart of FIG. 4 may be viewed as depicting an example of steps of a method implemented in the computing device 103 (FIG. 1) according to one or more embodiments.

Beginning at box 403, the product reference locator 115 searches behavior-based search data 127 for the n-gram 209. This search produces a list of product identifiers 218 which a user has viewed after using that n-gram 209 as a query in past searches. Next, at box 406, the product reference locator 115 uses attributes to filter out product identifiers 218 that don't match the community content page 203 which contained the particular n-gram 209. Examples of attributes include author/artist, title, brand, product category, etc. The product reference locator 115 combines attributes 239 of the product identifier 218 associated with the n-gram 209 with attributes 242 of the community content page 203 which contained the particular n-gram 209. The resulting combination is an attribute score for each product identifier 218. Product identifiers 218 with a score less than a threshold are removed at box 406 and are not considered in the further processing of FIG. 4.

The search performed at box 403 also provides the number of hits for each of the product identifiers 218 in the search results. At box 409, the product reference locator 115 uses the number of hits to estimate a conditional probability for viewing the identified product after a search using the n-gram 209. Next, at box 412 the product reference locator 115 compares the conditional probability for the n-gram 209 to a threshold. If at box 412 it is determined that the probability does not exceed the threshold, then n-gram 209 is not a potential product reference and the process of FIG. 4 is complete. If at box 412 it is determined that the probability meets or exceeds the threshold, at box 415 the product reference locator 115 places the n-gram 209 into the second pool of potential product references 233 and the process of FIG. 4 is complete.

Although the flowchart of FIG. 4 includes a number of boxes or functions, these functions are optional, and a particular embodiment may not include all functions. For example, some embodiments include the attribute score filtering feature in box 406 while others do not.

Figure 5:
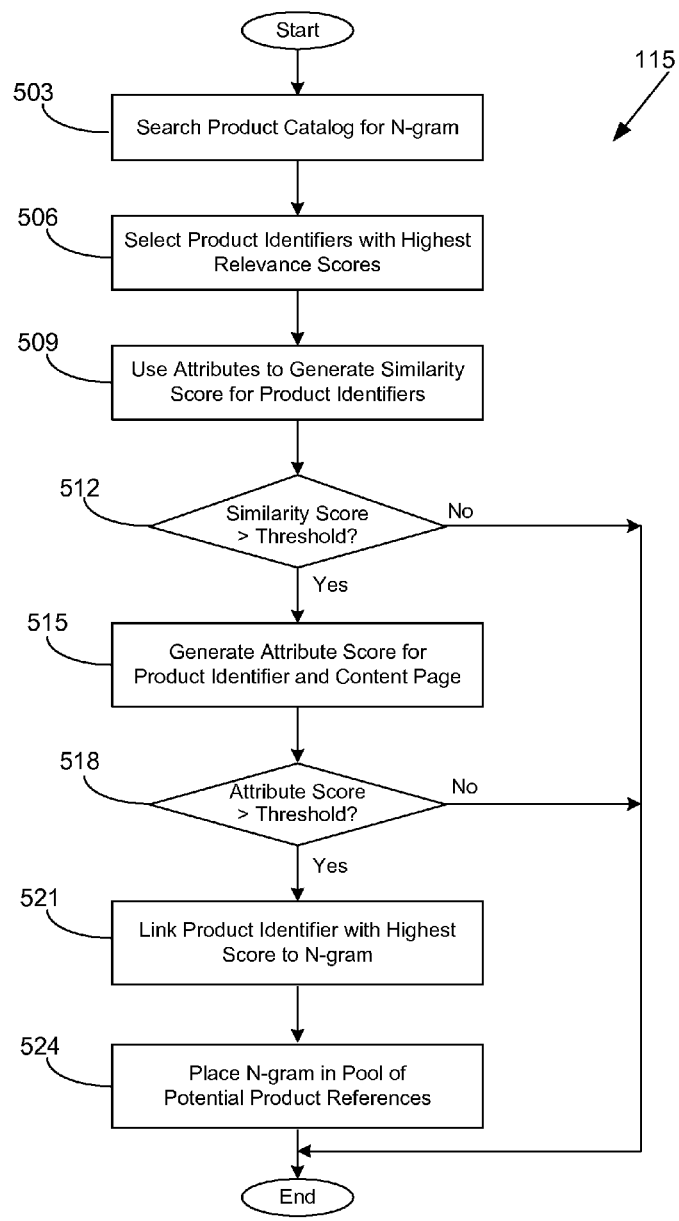
FIG. 5 is a flowchart illustrating another example of functionality implemented as portions of a product reference locator application executed in a computing device in the networked environment of FIG. 1 according to various embodiments of the present disclosure.

As explained above in connection with FIG. 3, the product reference locator 115 uses a product relevance search strategy to identify some n-grams 209 as a potential product reference. Referring now to FIG. 5, shown is a flowchart that provides further details of this use of product relevance strategy, in various embodiments of the product reference locator 115. It is understood that the flowchart of FIG. 5 provides merely an example of the many different types of functional arrangements that may be employed to implement the operation of the portion of the product reference locator 115 as described herein. As an alternative, the flowchart of FIG. 5 may be viewed as depicting an example of steps of a method implemented in the computing device 103 (FIG. 1) according to one or more embodiments.

Beginning at box 503, the product reference locator 115 searches the product catalog data 124, using the n-gram 209 as a search query 212. At box 506, the product reference locator 115 selects from the search results the product identifiers with the N highest relevance scores, where N can be predefined, user-configurable, or calculated. Next, at box 509 the product reference locator 115 generates a similarity score for each product identifier 218 using attributes of the selected product identifier 218 and attributes of the n-gram 209. Examples of such attributes may include title, author, brand name, etc. In some embodiments, the similarity score is a longest common weighted subsequence (LCWS) score.

At box 512 the product reference locator 115 compares the similarity score for the n-gram 209 to a threshold. If at box 512 it is determined that the similarity score does not exceed the threshold, then n-gram 209 is not a potential product reference and the process of FIG. 5 is complete. If at box 512 it is determined that the similarity score meets or exceeds the threshold, the product reference locator 115 proceeds to box 515.

At box 515, the product reference locator 115 combines attributes 239 of the product identifier 218 associated with the n-gram 209 with attributes 242 of the community content page 203 which contained the particular n-gram 209. Examples of attributes include author/artist, title, brand, product category, etc. The resulting combination is an attribute score for each product identifier 218.

Next, at box 518 the product reference locator 115 determines whether any of the attribute scores meet a threshold. If at box 518 it is determined that no attribute score meets the threshold, then n-gram 209 is not a potential product reference and the process of FIG. 5 is complete.

If at box 518 it is determined that at least one attribute score meets the threshold, processing continues at block 521. At block 521 the product reference locator 115 selects the product identifier 218 with the highest score and links the selected product identifier 218 to the n-gram 209. Next, at block 524 the product reference locator 115 places the n-gram 209 into the first pool of potential product references 221 and the process of FIG. 5 is complete.

Although the flowchart of FIG. 5 includes a number of boxes or functions, these functions are optional, and a particular embodiment may not include all functions. As a non-limiting example, the relevance score filtering feature (box 506), the similarity score feature (boxes 509 and 512), and the attribute score feature (boxes 515 and 518) are each independent, and may be included or excluded in any combination.

Figure 6:
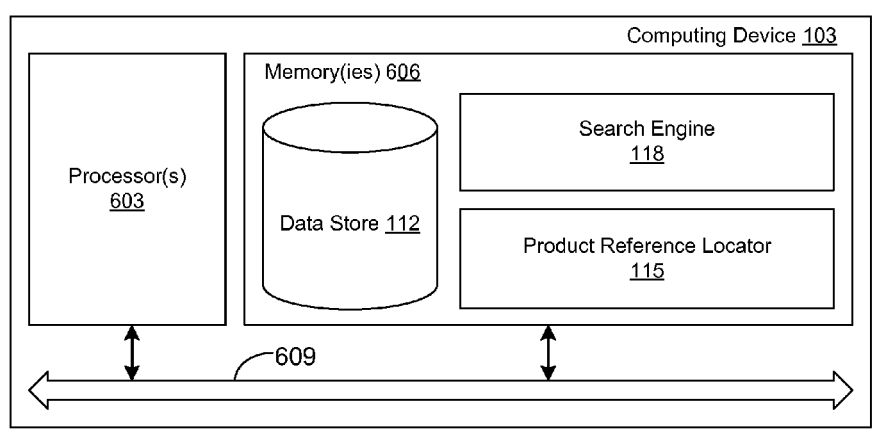
FIG. 6 is a schematic block diagram that provides one example illustration of a computing device employed in the networked environment of FIG. 1 according to various embodiments of the present disclosure.

Moving on to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the product reference locator 115, and potentially other applications. Also stored in the memory 606 may be a data store 112 and other data. In addition, an operating system may be stored in the memory 606 and executable by the processor 603. While not illustrated, the client device 106 also includes components like those shown in FIG. 6, whereby product reference locator 115 is stored in a memory and executable by a processor.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors and the memory 606 may represent multiple memories that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the product reference locator 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 4, and 5 show the functionality and operation of an implementation of portions of the product reference locator 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the product reference locator 115, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising the steps of:
extracting, by a computing device, a plurality of n-grams from a page of user-submitted content;
searching, by the computing device, a product catalog for each n-gram in a first portion of n-grams to produce a plurality of search results, the first portion of n-grams containing the n-grams with a length greater than a predetermined threshold and that do not contain digits;
evaluating, by the computing device, the search results and placing each n-gram in the first portion of n-grams into a first pool of potential product references based on the search results;
for each n-gram not in the first portion of n-grams, using behavior-based search data, by the computing device, to obtain a plurality of product identifiers that map to the n-gram and a conditional search probability for each of the product identifiers;
eliminating, by the computing device, the product identifiers based on attribute matching between the product identifiers and the page of user-submitted content; and
placing, by the computing device, each n-gram in a second portion into a second pool of potential product references when the corresponding search probability exceeds a threshold.

2. The method of claim 1, further comprising the step of:
selecting a subset of the product identifiers that exceed a predetermined rank.

3. The method of claim 2, further comprising the steps of:
generating a similarity score using attributes of the selected subset of product identifiers and attributes of the each n-gram; and
placing the each n-gram into the second pool of potential product references when the similarity score exceeds a threshold.

4. A system, comprising:
at least one computing device; and
a product reference locator in the at least one computing device, the product reference locator comprising:
logic that extracts a plurality of n-grams from text content; and
logic that evaluates each of the n-grams as a potential product reference using at least one of a product catalog search for the each n-gram and a conditional probability for the each n-gram obtained from behavior-based search data, and
logic that determines that the product catalog search is used for the each n-gram when the each n-gram does not contain a digit or has a length greater than or equal to a predetermined threshold,
wherein each of the n-grams is found to be a potential product reference based on results from the product catalog search if the search was used for the evaluation, and wherein each of the n-grams is found to be a potential product reference based on the conditional probability exceeding a threshold if the behavior-based search data was used for the evaluation.

5. The system of claim 4, wherein the text content comprises user-submitted content.

6. The system of claim 5, wherein the text content comprises community content.

7. The system of claim 4, wherein the text content comprises a user-submitted web page.

8. The system of claim 4, further comprising logic that determines whether the product catalog search or the conditional probability is used to evaluate based on at least one character attribute of the each n-gram.

9. The system of claim 4, further comprising logic that determines that the behavior-based search data is used for the each n-gram when the each n-gram contains a digit and has a length less than a predetermined threshold.

10. The system of claim 4, further comprising logic that uses the behavior-based search data to obtain, for each n-gram in a second portion of the n-grams, a set of product identifiers that map to the each n-gram.

11. The system of claim 8, further comprising logic that eliminates one of the product identifiers based on attribute matching between the product identifiers and the text content.

12. The system of claim 4, further comprising logic that divides the text content into at least one sentence before the extracting.

13. The system of claim 4, further comprising logic that, before the evaluation, eliminates one of the n-grams based on at least one character attribute.

14. The system of claim 4, further comprising logic that, when using the product catalog search for the evaluation, eliminates one of the n-grams if the one n-gram does not use a title case.

15. The system of claim 4, further comprising logic that, when using the behavior-based search data for the evaluation, eliminates one of the n-grams if the one n-gram does not include a digit.

16. A method, comprising the steps of:
- extracting, by a computing device, a plurality of n-grams from a page of community content;
- for a first portion of the n-grams, searching a product catalog, by the computing device, for each n-gram in the first portion when the each n-gram does not contain a digit or has a length greater than or equal to a predetermined threshold to produce a plurality of search results;
- evaluating, by the computing device, the search results and placing each n-gram in the first portion into a first pool of potential product references based on the search results;
- for a second portion of the n-grams, using behavior-based search data in the computing device to obtain, for each n-gram in the second portion, a set of product identifiers that map to the each n-gram and a conditional search probability for each of the product identifiers;
- placing, by the computing device, each n-gram in the second portion into a second pool of potential product references when the corresponding conditional search probability exceeds a threshold; and
- merging, by the computing device, the first pool of potential product references and the second pool of potential product references by eliminating duplicates.

17. The method of claim 16, further comprising the step of selecting the first portion of the n-grams based on at least one character attribute of the each n-gram.

18. The method of claim 16, further comprising the step of using the behavior-based search data to obtain, for each n-gram in the second portion, a set of product identifiers that map to the each n-gram.

19. The method of claim 16, further comprising the step of eliminating one of the product identifiers based on attribute matching between the product identifiers and the page of community content.

20. The method of claim 16, further comprising the step of eliminating one of n-grams based on a character attribute, before the evaluation.

21. The method of claim 16, further comprising the step of eliminating one of the n-grams, before using the product catalog search on the first portion of the n-grams, if the one n-gram does not use a title case.

22. The method of claim 16, further comprising the step of eliminating one of the n-grams, before using the behavior-based search data on the second portion of the n-grams, if the one n-gram does not include a digit.

* * * * *